United States Patent [19]
Dittmann et al.

[11] Patent Number: 5,489,909
[45] Date of Patent: Feb. 6, 1996

[54] SENSOR ARRANGEMENT, ESPECIALLY FOR A LANDMINE

[75] Inventors: Frank-Lutz Dittmann, Eckental/Eschenau; Wolfgang Babel, Rothenbach; Robert Westphal, Nuremberg, all of Germany

[73] Assignee: Diehl GmbH & Co., Nürnberg, Germany

[21] Appl. No.: 891,392

[22] Filed: May 29, 1992

[30] Foreign Application Priority Data

Jun. 14, 1991 [DE] Germany .......................... 41 19 612.0
Jun. 27, 1991 [DE] Germany .......................... 41 21 274.6

[51] Int. Cl.⁶ .......................... G01S 13/86; F42C 14/08; F42C 13/04
[52] U.S. Cl. .......................... 342/68; 102/427
[58] Field of Search .................. 342/68, 69, 42; 102/401, 416, 417, 418, 419, 420, 425, 427, 424, 426; 367/93, 94, 95, 96

[56] References Cited

U.S. PATENT DOCUMENTS

| | | | |
|---|---|---|---|
| 3,725,943 | 4/1973 | Spanos | 343/797 |
| 3,763,780 | 10/1973 | Kasinoff | 102/427 |
| 3,780,653 | 12/1973 | Stinchcomb | 102/427 |
| 3,836,949 | 9/1974 | Ergon . | |
| 4,042,923 | 8/1977 | Merrick . | |
| 4,308,537 | 12/1981 | Berry et al. | 356/5 X |
| 4,332,468 | 6/1982 | Stützle | 356/5 |
| 4,409,899 | 10/1983 | Owen et al. | 102/211 |
| 4,422,075 | 12/1983 | Nerheim | 102/212 |
| 4,493,114 | 1/1985 | Geller et al. | 455/617 |
| 4,499,468 | 2/1985 | Montana et al. | 342/463 |
| 4,614,317 | 9/1986 | Stavis | 244/3.19 |
| 4,675,677 | 6/1987 | von Maydell et al. | 342/25 |
| 4,712,479 | 12/1987 | Babel | 102/427 |
| 4,859,054 | 8/1989 | Harrison | 356/5 |
| 4,860,658 | 8/1989 | Lindstadt et al. | 102/427 |
| 4,866,447 | 9/1989 | Loucks | 342/58 |
| 4,908,626 | 3/1990 | Loucks | 342/60 |
| 4,922,824 | 5/1990 | Schubart | 102/387 |
| 4,990,920 | 2/1991 | Sanders, Jr. | 342/14 |
| 5,001,985 | 3/1991 | Reid et al. | 102/427 |
| 5,062,154 | 10/1991 | Geller et al. | 359/154 |
| 5,170,162 | 12/1992 | Fredericks | 340/935 |
| 5,206,653 | 4/1993 | Westphal | 342/61 |
| 5,371,502 | 12/1994 | Dittmann | 342/68 |

FOREIGN PATENT DOCUMENTS

| | | |
|---|---|---|
| 0375872 | 7/1990 | European Pat. Off. . |
| 3625334 | 9/1989 | Germany . |
| 2174482 | 11/1986 | United Kingdom . |

*Primary Examiner*—John B. Sotomayor
*Attorney, Agent, or Firm*—Scully, Scott, Murphy & Presser

[57] ABSTRACT

A sensor arrangement for an active member, especially such as a landmine which is deployed against ground and airborne target objects, including a waking or proximity sensor which is responsive to the approach of a target object. A high degree in the precision of direction-finding, in addition to target classification; can be achieved by means of a larger passive bearing or direction-finding base, such as can be set up through the positioning of at least three microphones about the mine or at a certain distance from the mine. Hereby, such a passive acoustic direction-finding or bearing base evidences the advantage in contrast with essentially the active high-frequency direction-finding, in that the mine cannot be located from the target object and thus is able to remain in constant operation upon the activation of a waking or proximity sensor without any danger of the mine having its presence betrayed. For a remote distance resolution for a multiple target-recognition, there must be evaluated a larger passive measurement base, as a result of which this evaluation, for instance, is then operatively associated with the active sensor (radar).

6 Claims, 5 Drawing Sheets

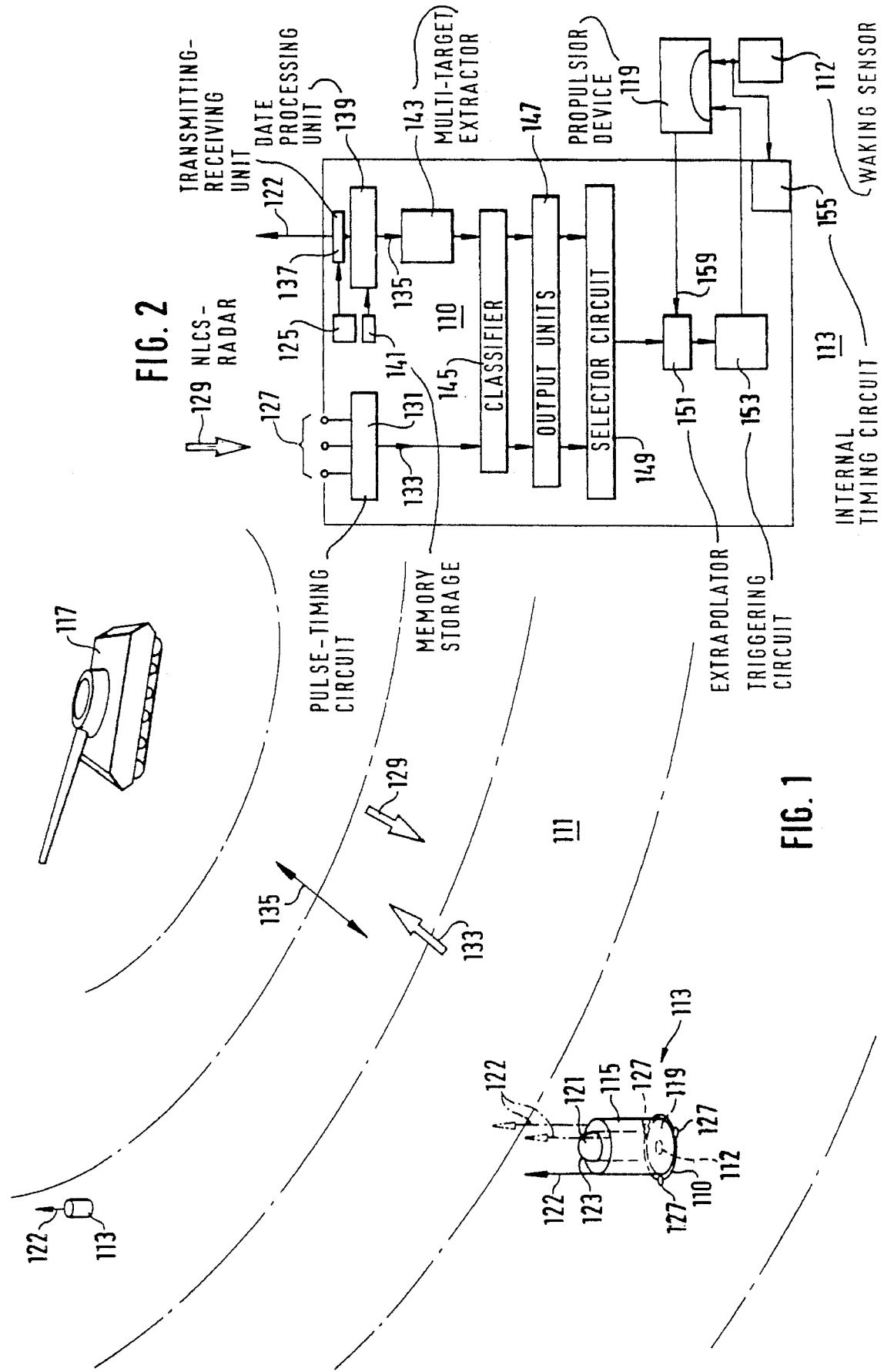

SENSOR ARRANGEMENT, ESPECIALLY FOR A LANDMINE

BACKGROUND OF THE INVENTION

1. Field of the Invention

The present invention relates to a sensor arrangement for an active member, especially such as a landmine which is deployed against ground and airborne target objects, including a waking or proximity sensor which is responsive to the approach of a target object.

2. Discussion of the Prior Art

The mines of a modern, intelligent blocking system are essentially designed to be equipped with sensor arrangements, which in order to enable an effective combatting of a potential target object penetrating into the blocked area, must be capable of detecting, locate and, possibly, also classifying this target object. Hereby, the target object should be acquired even while still at a distance of a few hundred meters, when due to the presence of artificial or natural obstructions, there is not afforded a direct (optical) line of sight between the sensor arrangement and the target object. This can be basically carried out by means of a so-called "None Line of Sight" radar which operates at such low frequencies that these, as a consequence of diffraction phenomena encountered at roughnesses, extensively evidence a wave dispersion along the ground and thereby beyond the optical shadow boundary; and correspondingly also feedback signals from covered reflectors to the transmitting-receiving or transceiver installation. In order to be able to more readily recognize the penetration of potential target objects into the surveilled blocked area, even when no approach of a target object is signaled by a waking or proximity sensor; from time to time there is activated the high-frequency energy radiation, in order to determine and to store the surrounding terrain situation (with its locally-required, at least quasi-stationarily present and natural reflectors); inasmuch as through a comparison with the thus obtained information over the terrain, there can be more easily recognized the penetration of a foreign body and thereby of a potential target object. The evaluation in the amplitude of the reflected receiving energy facilitates a certain degree of target classification. By means of an evaluation of the reflection within so-called time frames; in effect, in dependence upon distance, there is also obtained a multiple-target resolution.

SUMMARY OF THE INVENTION

For an effective combatting or attacking of multiple targets; in essence, also through alternating autonomous assignment of tasks among mines into whose effective ranges target objects have penetrated, there are additionally required directional informations in order to analyze the movements of the targets and to be able to estimate therefrom whether a target object which is of interest will presumably dwell for a sufficiently lengthy period of time in or above a terrain region within which it can be attacked by means of the mine which is presently active; and which if required can track the target object, with a sufficient chance of success. Although the electromagnetic sensor delivers a good resolution as to distance, for a determination of the target direction, it is necessary to meet increased technologically constructive equipment and signal-processing demands. For this purpose, there can be employed the behavior of an antenna grouping, through the intermediary of which there is concurrently obtainable an artificial doppler information by means of switching among antennas, so that even in the presence of momentarily still-standing or slowly moving target objects, there can be attained a useable doppler information. A higher degree in the precision of direction-finding, in addition to target classification; however, can be achieved by means of a larger passive bearing or direction-finding base, such as can be set up through the positioning of at least three microphones about the mine or at a certain distance from the mine. Hereby, such a passive acoustic direction-finding or bearing base evidences the advantage in contrast with essentially the active high-frequency direction-finding, in that the mine cannot be located from the target object and thus is able to remain in constant operation upon the activation of a waking or proximity sensor without any danger of the mine having its presence betrayed. For a remote distance resolution for a multiple target-recognition, there must be evaluated a larger passive measurement base, as a result of which this evaluation, for instance, is then operatively associated with the active sensor (radar).

A surveying for the passive system; in essence, that of the base configuration for the microphones relative to each other and with regard to the active member is not necessary when there is defined the configuration for the microphones relative to each other and with regard to the active member. However, when the base configuration is constructively excessively restricted, then also each microphone can be connected to the active member by means of a flexible anchoring or fettering element; in effect, a connecting cable with the active member from which it is launched at a specified time. Thus, it is possible to implement a base configuration possessing applicably large dimensions in order to be able to facilitate an autonomous calibration of the configuration or placement for the microphones. In any case, the combination of the continually operationally-ready passive direction-finding base with waking function and the only temporarily therewith connected active NLOS-proximity sensor wherein through the detection line from a mere summation effect of a multi-faceted but difficultly foolable system producible from available component which is adapted for target tracking for the highly-effective utilization of modern interactive defense systems with proximity mines for side and top attacks.

BRIEF DESCRIPTION OF THE DRAWINGS

Additional alternative and modifications, as well as further features and advantages of the invention can now be more readily ascertained from the following detailed description thereof, in which the specification describes various preferred embodiments of the invention, taken in conjunction with the accompanying drawings; in which:

FIG. 1 illustrates a scenario representative of a target object passing within the effective range of a mine pursuant to the invention;

FIG. 2 illustrates a block circuit diagram of the signal processing sequence which is implemented in the sensor arrangement of the mine;

DETAILED DESCRIPTION

Figure 3:
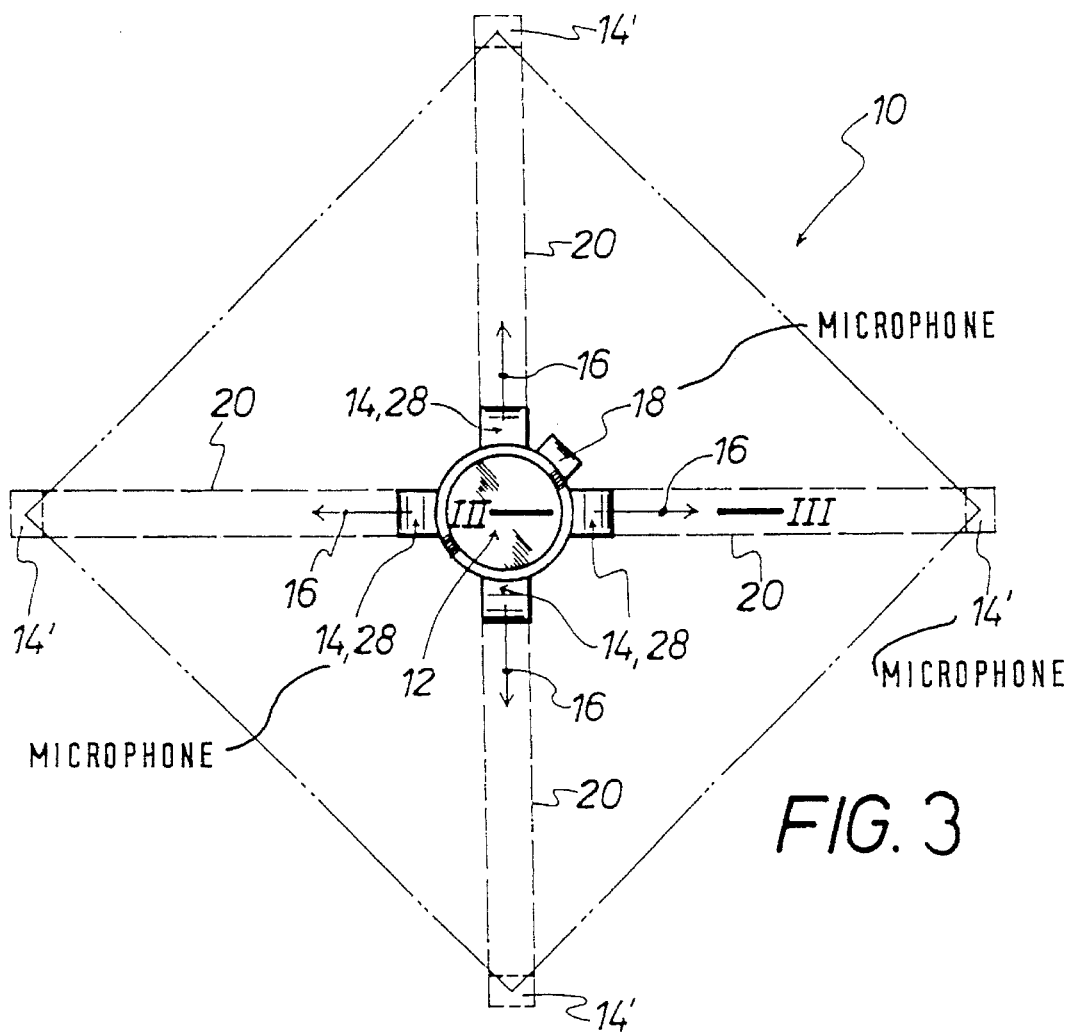
FIG. 3 illustrates a top plan view of a first embodiment of an acoustic bearing or direction-finding base, wherein the sensor arrangement is shown through solid lines in the inactive lurking or waiting position and through thin phantom-lines in the active position.

A mine 113 which has been deployed in the blocked region 111 can be either manually positioned by combat engineers or ejected by means of deploying devices. In the last instance, it is may be equipped with an erecting arrangement such as is more specifically described in U.S. Pat. No. 4,922,824, in order to achieve a most possibly vertical orientation of the mine launching or firing apparatus 115. For the defense against or warding off of a target object 117 which penetrates into the blocked region 111, there is activated a propulsion device 119, such as a propellent charge or a rocket propulsion mechanism, and as a result thereof the mine or active member 121 is launched from the launching apparatus 119 into the airspace above the blocked region 111. From there, the active member 121 again descends through the use of a parachute, so as to be able to scan the terrain in the manner of a search head-equipped article of submunition, and to trigger its warhead 123 possessing a projectile-forming hollow charge covering, as soon as the search head detects ahead thereof in its effective direction the target object 117 which is to be attacked; such as is generally described in more extensive detail in British Patent 2,174,482 A, which is assigned to the common assignee of the present application.

In any event, the kinematics for the ascent of the active member 121, the reversal in its movement and the unfolding of the parachute system for the braked rotating descent into the blocked region requires a certain period of time, while, on the other hand, the maximum radius of effectiveness within the blocked region 111 is limited by the distance of effectiveness the warhead 123 and the inclination of the search head during the spirally-shaped scanning of the target area. When the target object 117 which triggered the ascent of the active member 121 does not move towards the mine 113, but crosses the effective region; for instance, only along a remote secant, then the target object 117 may have already again left the effective range of the mine prior to the active member 121 having entered into its operationally-ready phase of descent; and due to a lack of a hit in the target object 117, the activation of the mine 113 was useless.

As a result thereof, the propulsion device 119 should not be activated merely because a waking sensor 112; for example, such as a seismic sensor which is responsive to the ground vibrations caused by a tracked vehicle, reports merely the approach of a potential target object 117. Instead thereof, there is provided a sensor device 110 which contains a radar 125 by means of which subsequent to the launch of the mine 113, there is initially input its surrounding terrain and then again to switch off the radar 125 so as not to betray the position of the mine 113. This adaptation to the surroundings can be repeated at predetermined time intervals as prescribed in the circuitry technology; in effect, can be freshened up or updated. For the remainder; however, the sensor device 110 is again only activated by the waking sensor 112 so as to, in comparison with the most recent stored information over the surroundings, to determine the distance to and direction of movement of the potential target object 117 in a reflective beam position-finding process. Here, the difference in the scene in comparison with the previously scanned region in the surroundings, already in the absence of any target object 117 which has penetrated facilities a first target analysis and the target-echo amplitude information allows for a certain target classification in order not to deploy the active member 121 against dummy targets or against such objects which are not worthy of being attacked, but to remain in preparedness against target objects 117 which are to be actually warded off.

In any case, the mine 113 does not rise to a significant extent above the ground so that in a hilly blocked region 111, or through artificial or natural obstructions such as structures, buildings or plantings, there cannot be assured a radar-typical direct line of sight communication from the sensor device 110 to the target object 117. As a result thereof, by means of an antenna 122 which is extendable from the launching apparatus 115 there is radiated a spherical wave possessing a relatively low transmitting frequency (in the magnitude of a few hundred MHz), inasmuch as this possesses the property of following relatively good any formation over the terrain and to thereby deliver target echo-information even in the absence of any visual connection to the target object 117.

Such a so-called NLOS-radar 125 is described in detail in copending German Patent Appln. NO. P 41 17 873.4, filed on May 31, 1991, which sets forth the circuitry technology of a sensor for activating an active member; the disclosure of which is incorporated herein by reference.

For a further optimizing of the information relative to the target object 117, there can be implemented a doppler evaluation of the received target reflections. In any event, this evaluation is not only extremely complex and incident to errors for slowly moving target objects 117 but also, since as a rule, there cannot be received any lines-of-sight reflections, but electromagnetic radiation energy must be evaluated which, during its spreading out over the ground, is moreover extensively adversely influenced. As a result thereof, it is more expedient to extend from the mine 113 at least two further rod antennas 122 and to thereby build up a multi-point bearing or direction-finding base which produces a less disturbed target information, in that (to a certain extent for achieving an artificial doppler effect) the receipt between these antennas 122 is switched in a grouped manner.

Concurrently, this direction-finding base can also serve for the directional bearing to the detected target object 117, in order to improve upon the multi-target resolution and to attain additional motion coordinates relative to the acquired target object 117. A directional information 133 is, in particular, also of interest when there are present overlapping blocked regions 111 formed by a plurality of mines 113 from a mine field, and these mines 113 stand in an information exchange among each other, for which purpose there can be employed the radar antennas 122 during pauses in the direction-finding. When there is determined from the location of a mine 113 through radio contact-interrogation between neighboring mines 113, that there is available in a direction towards the detected target object 117 a still intact further mine 113 with more expedient attacking capabilities relative to the conditions of its location, then the target information from the first-mentioned mine 113, while blocking the activation of its propulsion device 119, is transmitted to such more expediently positioned mine 113 which thereby to a certain extent receives a command, although possibly due to surroundings of its terrain could itself not be capable of transmitting a clear and expedient target information. Moreover, the bearing information 133, clear than by means of the mere proximity and motion evaluation, allows for a distinction between different target objects 117 which are simultaneously detected in the blocked region 111, and thereby different mines are to be assigned for defensive purposes.

Even more precise than those obtained by means of the small-surfaced antenna groups 122 are the bearing or direction-finding results of an acoustic bearing base consisting of at least three microphones 127 which are arranged about the periphery of the launching apparatus 115, or which are extendable therefrom in a radial distance for the formation of a still larger base. Moreover, the acoustic direction-finding for the bearing of the mine 113 from the target object 117, in comparison with the active radio direction-finding, has the advantage of a lower probability in the betrayal for a passive direction-finding system. In this system, there is measured in a known per se manner the time differential in the receipt of correlatively-filtered acoustic results; namely, the sound spectrum 129 emanating from the target object 117. The greater the time differential of the receipt of the same result which is determined in a pulse-timing circuit 131, the larger will be the deviation bearing angle relative to the constructively given median perpendiculars to the connection between the two presently interrogated microphones 127. With this directional bearing there can be interlinked in the sensor device 110 a target-distance information 135 which is delivered by the NLOS-radar 125, in order to achieve a vectorial multi-target resolution for the effectiveness-optimized association of a still operationally-ready mine 130 with regard to its active member 121. When, pursuant to the preferred apparatus design, the sensor arrangement 110 also remains in operational readiness after the launching of the active member 121, there is not produced any surveillance gap in the blocked region 111 and there is eliminated the need for the utilization of a network of command stations for a certification over the applicable mine condition and for the target assignment to still operationally-ready mines 113.

For a more detailed elucidation of the acoustic bearing base, FIG. 3 illustrates schematically a sensor device 10 with four microphones which are distanceable from the active member 12 for achieving a large base configuration from the active member 12, in comparison with the base of the active member 12, and which is indicated by the arrows 16. A fifth microphone 18 is provided on the active member 12. The microphones 12 are permanently connected with the active member 12 in such a manner that the distance of the microphones 14 from the active member 12 in the active operative position of the sensor device 10, in which the microphones are identified by the reference numeral 14', is specified relative to the active member 12 and the spacing between the microphones 14'.

The four microphones 14 are uniformly spaceble from the active member 12 about the circumferential direction, so that it is at least approximately equally well possible from to detect a target which is to be attacked from each and every direction. Only when the target is in alignment with two microphones 14' is it not possible to detect the target through the intermediary o#these two microphones 14'.

Figure 4:
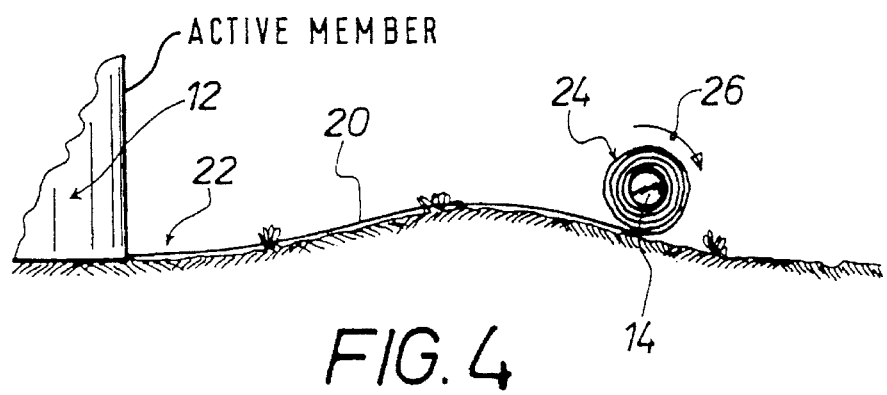
FIG. 4 illustrates a side view of the partially sectioned shown active member including a spring steel web adapted to uncoil from the active member, and having a microphone fastened to the end section which is distant from the active member.

FIG. 4 illustrates in a partially sectioned side view, an active member 12 including a spring steel band or web 20 which uncoils from the active member; in effect, radially extending, which has one end section 22 thereof fastened to the active member 12, and whose second end section 24 is still coiled about an associated microphone 14 with a few windings. The spring steel web 20 which is coiled about the microphone 14 is prestressed in such a manner that the specified time it uncoils in the direction of the arrow 26 from the microphone 14, whereby this is then properly spaced from the active member 12.

Figure 5:
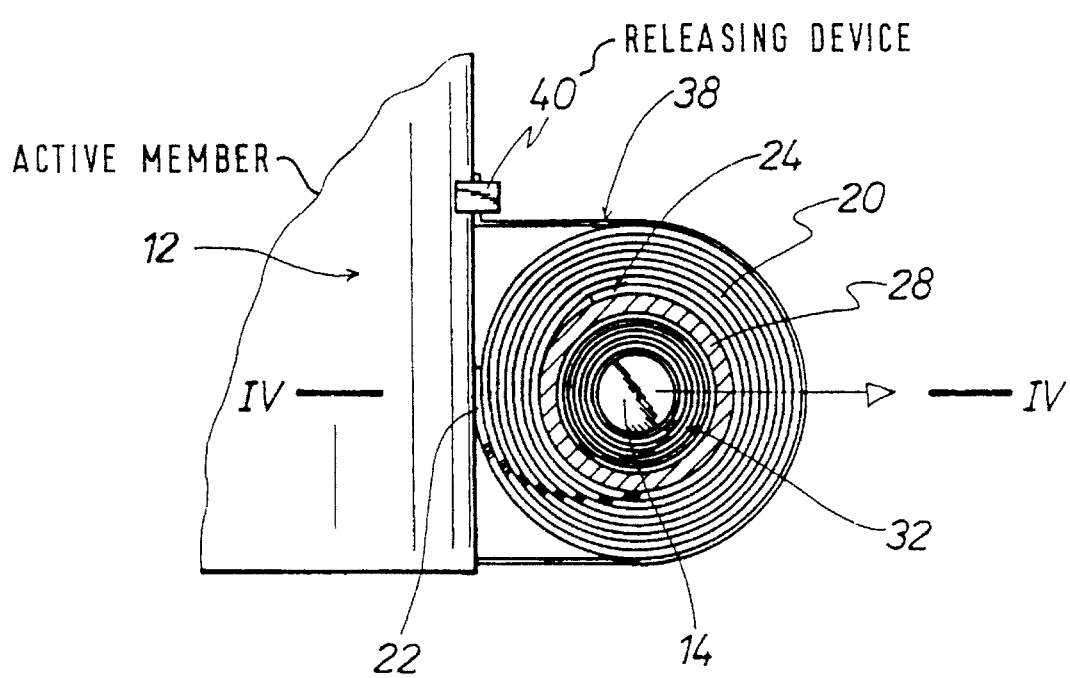
FIG. 5 illustrates a sectional view taken along line III—III in FIG. 3 through a microphone which is arranged in a housing, wherein the housing is encompassed by a spring steel web which is coiled about the housing, with the spring steel web being retained in its coiled condition about the housing through a latching and unlatching device, and with the active member being shown in a side view in partial section.
Figure 6:
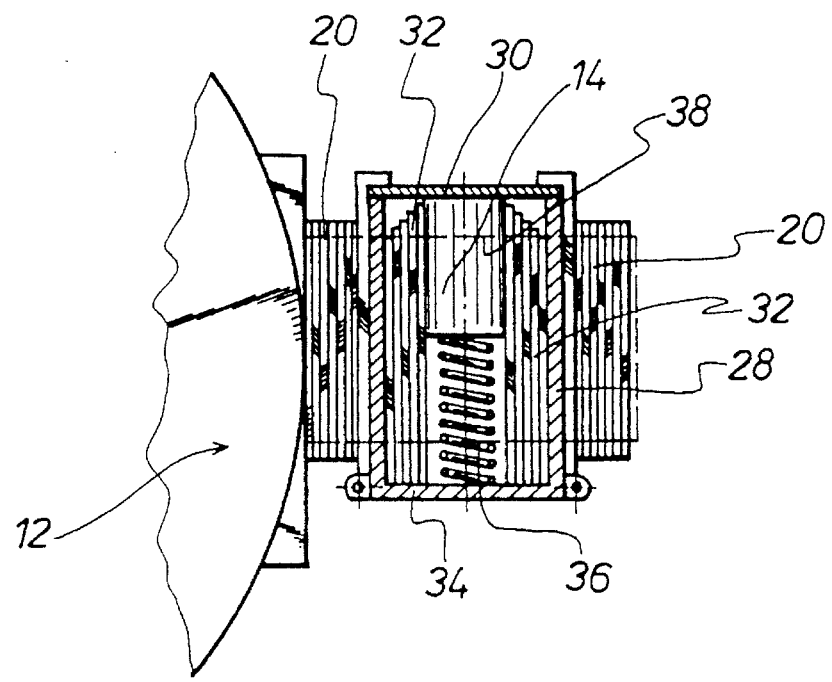
FIG. 6 illustrates a sectional view taken along line VI—VI in FIG. 5.

FIGS. 5 and 6 illustrate, on a different scale, one of the microphones 20 in a therewith associated housing 28. The housing 28 is closed off by a cover 30 in the lurking or waiting condition of the active member 12. The microphone 14 is connected with the housing 28 by means of telescopically extendable arrangement 32. Positioned between a microphone 14 and the housing 28 or; in essence, the bottom 34 of the housing 28, is a propulsion element 36 which may relate, for example, to a helical compression spring, a pyrotechnic power element, or the like. With the aid of the propulsion element 36, the microphone 14 can be moved out of the housing 28 at an opened cover. However, this is only first possible when the microphone 14 with the housing 28 is spaced away from the active member 12 through the uncoiling of the spring steel band 20. For this purpose, the spring steel band or web 20 has its one end section fastened to the active member 12 and its second end section 24 to the housing 28, in which there is located the microphone 14 with the telescopically extendable arrangement 32. Through the provision of a latching and unlatching device 38, the spring steel band 20 which is coiled about the housing 28 remains in its inactive position, until the latching and unlatching arrangement 38 is released with the aid of a releasing device 40, so that initially the spring steel band 20 can uncoil from the active member 12, whereupon the cover 30 is then released from the housing 28 and the microphone 14 is moved out from the housing 28 with the aid of the propulsion element 36.

Figure 7:
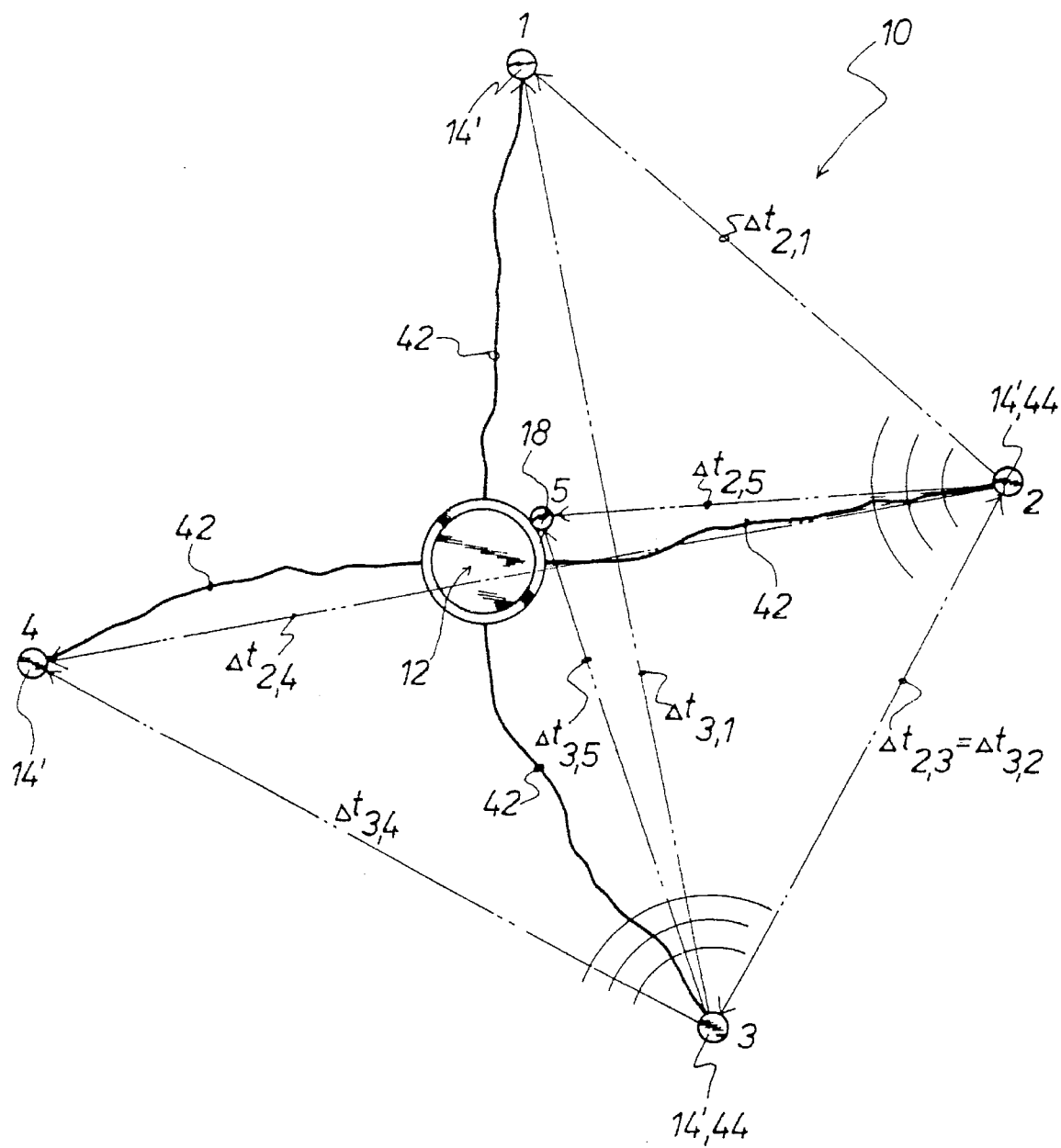
FIG. 7 illustrates a second embodiment of the sensor arrangement shown in a viewing direction from above, wherein the microphone have been ejected from the active member and are quasi-randomly distanced.
Figure 8:
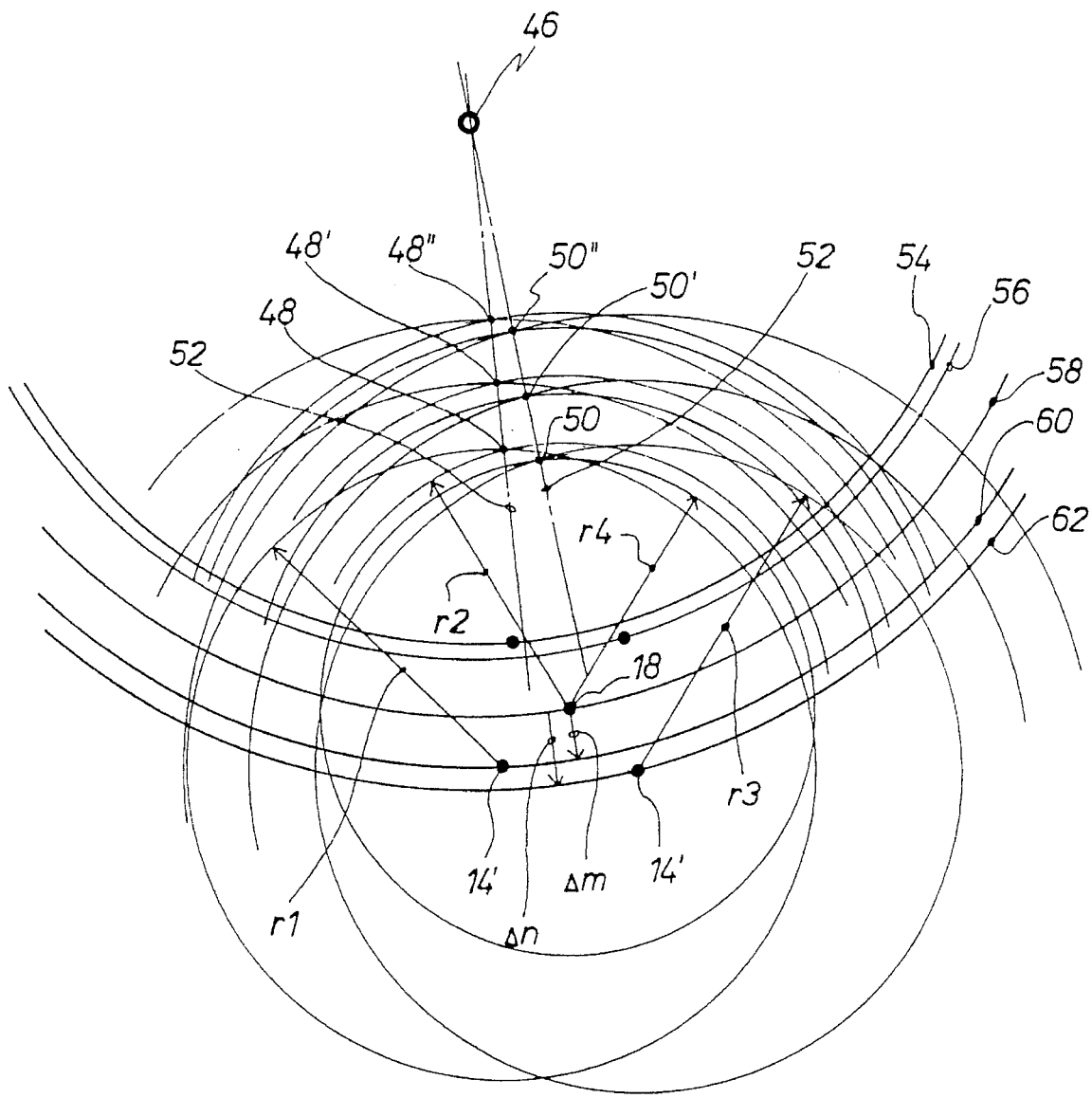
FIG. 8 illustrates a schematic representation of the principle of functioning for the direction-finding of a target with the aid of four microphones which have been ejected from an active member and with the aid of a fifth microphone which is located on the active member, whereby the sensor system, in essence, the microphone system is in a position to initially recognize the approximate orientation of the target and then thereafter on the basis of this approximate information, determine the suitable operative sensor or, respectively, microphone interconnection and evaluating strategy, in order to be able to accurately locate the target.

FIG. 7 illustrates a construction for the sensor arrangement 10 in which four microphones 14' are spaced quasi-randomly from the active member 12, as is indicated by the anchoring or fettering lines 42; in essence, cables. A fifth microphone 18 is provided on the active member 12. The four microphones 14' which are spaced from the active member 12 are identified by numerals 1 through 4, whereas the fifth microphone 18 on the active member 12 is identified by the numeral 5. The second and third microphone 14' are each presently equipped with a sound transmitting device 44 so that, with the aid of the microphones 14' and with the aid of the microphone 18, it becomes possible to determine sound transmission times $\Delta t_{i,k}$ and from these sound transmission times $\Delta t_{i,k}$ to be able to compute the distances between the microphones 14' amongst each other and the distances between the microphones 14' and the microphone 18 which is located on the active member 12 through the formation of the product from the applicable transmission time $\Delta t_{i,k}$ and the speed of sound. In this manner, there is thus obtained an autonomous acoustic system for positional vector determination. When the relatively large base configuration of the microphones 14' in relation to the active member 12 are autonomously determined, then it is possible in a relatively precise manner to determine a target 46 with the aid of at least two microphones 14' and the microphone 18 which is located on the active member, as is indicated in FIG. 8 through a few concentric circles relative to the applicable microphones 14', respectively, 18, and which increase over time. Hereby, the radius r1 is by the amount $\Delta$ n larger than the radius r2 extending from microphone 18, whereby $\Delta$ n corresponds to the radial distance between the microphone 18 and the left microphone 14' with regard to the target 46. The radius r3 which extends from the right microphone 14' is by the amount $\Delta$ m larger than the radius r4 which extends from the microphone 18. The circles with the radii r1 and r2 intersect at a point 48, and the circles with the radii r3 and r4 intersect at a point 50. The radii r1 and r2 which increase in size over time intersect, respectively, at points 48, 48', 48'', . . . ; and the radii r3 and r4 which increase correspondingly over time intersect at points 50, 50', 50'', . . . , which are located on hyperbolas or; approachingly on the asymptotes of the mentioned hyperbolas, and which resultingly intersect in the target 46 Through the points 48, 48', 48'', . . . or, respectively 50, 50' 50'', . . . there should be indicated that the microphones 14' or, respectively, the microphone 18 are effective at a certain time pulse. Through the respective two microphones 14' and the microphone 18 there are determined two target lines 52 which intersect in the target 46. When the two other microphones are also correspondingly utilized, then there are produced at least two further target lines for the even more precise acquisition or, in essence, detection of the target 46. Through a first approximate recognition of the direction of a sound occurrence which is caused by a target 46, as is indicated in FIG. 6 by the sound lines 54, 56, 58, 60 and 62, which extend through the applicable microphones 14' and, respectively 18, it is possible to specify a suitable microphone linkage and evaluating strategy such that, with the aid of the suitably positioned microphones 14', there can be undertaken a more precise target detection.

The inventive sensor arrangement 10, in a first detection step, thus recognizes the approximate direction of a target 46; meaning, a sound occurrence, and is then in the position, due to this first information, of implementing a suitable linkage of the microphones 14, 18, and a fitting evaluating strategy. At a failure of one of the microphones, it is possible, in an advantageous manner, to undertake an autonomous compensation for this microphone failure; for instance, through an applicable microphone configuration for affording the continuing functionality of the sensor device 10. An only imprecise target determination is possible when two microphones are located within a narrow spatial angle or sector relative to the target 46, inasmuch as then the intersecting points from the associated circles will then almost only tangentially contact. The intersecting point of these two almost only tangentially contacting circles has, in effect, an extremely large fuzzy or undefined region. This causes a considerable bearing or direction-finding error. Even during the self-organization of the sensor arrangement are these last-mentioned aspects considered; in essence, the arrangement, among other considerations, is designed such that at least two target bearings are obtained, whose bearing directional lineals 52 subtend therebetween the widest possible angle.

However, when during the approach of a target, the waking sensor 112 activates the sensor arrangement 110, the radar 125 is set into operation so that through a transmitting-receiving unit 137 and an approximating data processing circuit 139 in comparison with information over the surroundings, there is obtained from a memory 141 information as to the distance 135 to the potential target object 117. At the acquisition of a plurality of target objects 117, by means of a multi-target extractor 143, there is selected a target object 117 which is particularly expediently positioned relative to this mine 113, for an analysis in classifiers 145, which are additionally supplied with the bearing information 133 from the acoustic direction-finding base. Output units 147 deliver for the confirmed target objects 117 processed bearing and proximity informations to a selector circuit 149, in which in the presence of a plurality of simultaneously acquired target objects 117, there is determined the positioning of a target object 117 which is to be attacked in the most expedient manner in accordance with bearing and distance, so as to then estimate in an extrapolator 151 the presumed magnitudes of motion of the target object, and thereafter in a triggering circuit 153 determine the optimum point in time for the release of the propulsion device 119 of the active member, which was already previously prepared by the proximity-dependently operating waking sensor 112. However, in the event that no optimum attacking condition is present and another operationally-ready mine 113 is available; namely, from the propulsion device 115 still delivering a readiness signal 159 to the sensor arrangement 110, then that particular mine receives the attacking instructions. The hereinabove considered sensor device 110 is again switched off until the waking sensor 112 responds renewedly, or however, an internal timing circuit 155 temporarily activates the NLOS-radar 125 for the renewed adaption to the surroundings for refreshing or updating the content of the memory storage 141 for the surroundings.

What is claimed is:

1. Sensor arrangement for an active member, especially such as a landmine deployed against ground and airborne target objects; said active member comprising a waking sensor responsive to the approach of a target object; a low-frequency nondirectionally operating NLOS radar including a proximity-dependently operating multi-target extractor; a direction-finding base including a plurality of microphones for the obtention of a bearing information from the sensor arrangement to target objects; a memory storage connected to an output of said radar which is periodically updated with information relative to the surroundings obtained from the sensor arrangement, said active member including at least three microphones which are spaced from the active member so as to attain a relatively large base configuration in comparison with the base of the active member, one of said microphones being fixedly located on the active member, and the remaining microphones being connected with the active member, and wherein the microphones which are spaced from each other are arranged for determining their mutual spacing and the distance from the active member.

2. Sensor arrangement as claimed in claim 1, wherein said arranged comprises a plurality of switchable high-frequency antennas as a target direction-finding bearing base and for a target echo-doppler evaluation.

3. Sensor arrangement as claimed in claim 1, wherein a radar antenna of said arrangement simultaneously provides for a wireless information connection to other mines having sensor arrangements which remain active subsequent to the launching of the active members of said mines for effecting a surveillance of blocked areas.

4. Sensor arrangement as claimed in claim 1, wherein each said microphone which is distanced from the active member is mounted on telescopically extendable means and movable response to a propulsion element.

5. Sensor arrangement as claimed in claim 1, wherein said sensor arrangement for the recognition of the bearing of a target object responsive to the occurrence of a sound from said target object serves for the determination of a specific microphone linkage and evaluating strategy.

6. Sensor arrangement as claimed in claim 1, wherein propulsion means for the launch of the active member for defense against a (detected) target object is only placed in readiness and activated by the waking sensor when an extrapolator for target movements ascertains from actively obtained bearing information and passively obtained bearing information of a selected target object, the presence of expedient attacking conditions from a currently operationally-ready propulsion arrangement of an active member.

* * * * *